United States Patent Office 3,048,470
Patented Aug. 7, 1962

3,048,470
FREE-FLOWING AMMONIUM CHLORIDE
Adolf Leber, Mannheim, and Guenter Hansen, Ludwigshafen (Rhine), Germany, assignors to Badische Anilin- & Soda-Fabrik Aktiengesellschaft, Ludwigshafen (Rhine), Germany
No Drawing. Filed Mar. 9, 1959, Ser. No. 797,872
Claims priority, application Germany Mar. 12, 1958
7 Claims. (Cl. 23—100)

This invention relates to an ammonium chloride composition having improved physical properties and to a method of inhibiting the agglomeration of ammonium chloride.

Ammonium chloride tends to agglomerate or cake in storage, even when thoroughly dried, for example to a residual water or moisture content of 0.001% by weight. This residual moisture content is responsible for the caking tendencies, and these are accentuated by moisture picked up owing to the hydroscopicity of ammonium chloride.

It is known to suppress the tendency of hygroscopic materials to agglomerate by combining them with powdered substances, such as magnesium oxide, aluminum oxide, kieselguhr, phosphates or powders of synthetic materials. While in this manner free-running hygroscopic materials can in fact be obtained, there still remains the disadvantage that the materials, when dissolved in water, leave an insoluble residue as a result of the additions made. As a rule, this residue must first be removed by filtration before the solution can be put to practical use.

According to another method, the particles of hygroscopic materials which tend to agglomerate can be coated with waxes, oils, higher amines or paraffin waxes and the formation of lumps can thus be prevented. Substances treated in this way, however, dissolve only with difficulty in water and, if so dissolved, also leave an insoluble residue.

The agglomeration of hygroscopic materials can be prevented in a similar way by the addition of water-soluble wetting agents, such as alkyl or aryl sulfonates, but in many cases, particularly in the case of ammonium chloride, the addition of substances of the said type, because of their physiologically objectionable nature, precludes the use of the products so treated in the foodstuff and luxury food industries.

One of the principal objects of the present invention is to provide a solid and finely-divided ammonium chloride which is particularly stable against agglomeration. Another object of the invention is to provide an ammonium chloride which is soluble in water without residues, such as may occur when ammonium chloride is incorporated with additives to make it stable to agglomeration. A further object of the invention is to provide an ammonium chloride which is free-flowing. A still further object of the invention is to provide ammonium chloride which can be easily distributed by dosing means.

We have found that the disadvantages attached to using the aforesaid prior art additives are obviated and an ammonium chloride of a non-caking, free-flowing type which is soluble in water without leaving a residue and can be processed in dosing apparatus is obtained by using boron trioxides as an additive. Generally speaking, the ammonium chloride is admixed with an amount of boron trioxide sufficient to inhibit the agglomeration of the ammonium chloride particles. The resulting composition can be stored for a period of time extended beyond the caking period for the ammonium chloride in the absence of an agglomeration inhibitor.

For producing the ammonium chloride composition in accordance with this invention, it is good practice to mix intimately ammonium chloride obtained from an aqueous solution by crystallization and drying, with boron trioxide. The mixing can be achieved by grinding, for example.

Boron trioxide is preferably intimately incorporated with ammonium chloride in a proportion ranging from about 0.001% by weight to 0.8% by weight, more preferably from 0.01% to 0.4% by weight, percentage based on anhydrous ammonium chloride. It is preferable to avoid larger additions to maintain the adulteration of the ammonium chloride within acceptable limits.

It is recommended that an ammonium chloride which has been dried by conventional methods to a normal residual moisture content be employed. Such a residual moisture content is generally below about 0.1% by weight based on anhydrous ammonium chloride. It may be as low as about 0.05% and is generally above about 0.01% by weight.

In principle, the quantity of boron trioxide employed will be determined by the moisture content of the ammonium chloride. The quantity preferred is at least about one mol of boron trioxide ($B_2O_3$) to one mol of water, although smaller quantities may also be employed, but this causes an increasing tendency toward agglomeration. Additional quantities may be added to provide for moisture pick-up from the atmosphere. The quantity of boron trioxide employed will depend upon the conditions during storage and those faced in practical use.

The more finely-grained the boron trioxide and the more homogeneous the mixture with the ammonium chloride, the better the effect of the boron trioxide in preventing agglomeration. For example, a free-flowing ammonium chloride is obtained with a boron trioxide of a grain size of less than 0.4 mm. in an amount of about 1 mol per mol of residual water. However, boron trioxide of a grain size of, for example, 1 mm. is still suitable. It is less effective, however, than the same amount of more finely-grained boron trioxide.

The following example will further illustrate this invention, but the invention is not restricted to this example.

*Example*

Six kilograms of boron trioxide are added to 3,000 kilograms of ammonium chloride containing 0.05% of residual water which has been obtained from its aqueous solution by crystallization and drying, and the whole is intimately mixed. This corresponds to about 1 mol of boron trioxide to 1 mol of residual water. The boron trioxide has a grain size below 0.4 mm., and the bulk has a grain size between 0.2 and 0.1 mm. After storage for 8 weeks in bitumen-coated paper sacks in stacks of four sacks of 50 kilograms each, the product was just as free-flowing as on the day of its manufacture. The ammonium chloride which has been mixed with 0.2% of boron trioxide is, just like the untreated ammonium chloride, soluble in water to give a clear solution without residue.

Untreated ammonium chloride with the same content of residual water which is stored under the same conditions is firmly agglomerated in large cakes even after 3 days.

If the ammonium chloride is substantially freed from its residual water content by extensive drying to a water content of 0.001%, mixed with 0.4% of dry solid boric acid (corresponding to 0.2% of boron trioxide) and then stored, the product is solidly agglomerated even after a few hours. From this it will be seen that boron trioxide cannot be replaced by a corresponding amount of boric acid. The same is the case when no boric acid is added to the sharply dried ammonium chloride. This shows that the advantageous effect of boron trioxide is not solely due to the presence of boric acid in the end product. By mixing the said thoroughly dried ammonium chloride with 0.001% by weight of boron trioxide a non-caking mixture is obtained.

We claim:
1. A new composition of matter which comprises finely-divided solid ammonium chloride having a normal residual moisture content after drying admixed with an amount of boron trioxide in the range of about 0.001% to 0.8% by weight based on anhydrous ammonium chloride.
2. A composition as defined in claim 1 wherein the boron trioxide particle size is below about 0.4 mm.
3. A new composition of matter which comprises finely divided solid ammonium chloride having a moisture content of less than 0.1% admixed with from about 0.001% to 0.8% by weight of boron trioxide based on the weight of the ammonium chloride in its anhydrous state.
4. A new composition of matter which comprises finely divided solid ammonium chloride having a moisture content of less than 0.1% admixed with from about 0.01% to 0.4% by weight of boron trioxide based on the weight of the ammonium chloride in its anhydrous state, said boron trioxide having an average particle size of less than about 0.4 mm.
5. A method of treating ammonium chloride compositions to improve their physical properties and to prevent their agglomeration on storage which comprises drying finely divided solid ammonium chloride to reduce its moisture content, admixing with said ammonium chloride from about 0.01% to about 0.8% by weight of boron trioxide based on the weight of the ammonium chloride in its anhydrous state.
6. A method of treating ammonium chloride compositions to improve their physical properties and to prevent their agglomeration on storage which comprises reducing the moisture content of said ammonium chloride to less than 0.1%, admixing with said ammonium chloride in a finely divided state from about 0.001% to about 0.8% by weight of boron trioxide based on the weight of the ammonium chloride in its anhydrous state, said boron trioxide having an average particle size of less than about 0.4 mm.
7. A method of treating ammonium chloride compositions to improve their physical properties and to prevent their agglomeration on storage which comprises reducing the moisture content of said ammonium chloride to less than 0.1%, admixing with said ammonium chloride in a finely divided state from about 0.01% to about 0.4% by weight of boron trioxide based on the weight of the ammonium chloride in its anhydrous state, said boron trioxide having an average particle size of less than about 0.4 mm.

References Cited in the file of this patent
UNITED STATES PATENTS

| | | |
|---|---|---|
| 1,077,712 | Heyder | Nov. 4, 1913 |
| 1,759,737 | Eckerbom | May 20, 1934 |
| 2,119,970 | Smith | June 7, 1938 |
| 2,238,149 | Aeckerle | Apr. 15, 1941 |
| 2,368,806 | Cook | Feb. 6, 1945 |
| 2,500,770 | Pierce | Mar. 14, 1950 |
| 2,639,219 | Wiitala et al. | May 19, 1953 |
| 2,660,541 | Rinkenbach | Nov. 24, 1953 |
| 2,797,982 | McKinney | July 2, 1957 |

OTHER REFERENCES

Mellor: "Comprehensive Treatise on Inorganic and Theoretical Chemistry," vol. 2, pages 563, 564 (1922). Longmans, Green and Co., N.Y.